United States Patent [19]

Shiraishi et al.

[11] Patent Number: 4,914,616
[45] Date of Patent: Apr. 3, 1990

[54] CODED INCREMENTER HAVING MINIMAL CARRY PROPAGATION DELAY

[75] Inventors: Taketora Shiraishi; Yukihiko Shimazu, both of Itami, Japan

[73] Assignee: Mitsubishi Denki Kabushiki Kaisha, Japan

[21] Appl. No.: 131,864

[22] Filed: Dec. 11, 1987

[30] Foreign Application Priority Data

Dec. 15, 1986 [JP] Japan ................. 61-298007

[51] Int. Cl.$^4$ .............................................. G06F 7/50
[52] U.S. Cl. ...................................... 364/770; 377/44;
377/46; 377/54; 377/78; 377/126; 364/900;
364/960.2; 364/960.6; 364/926.5
[58] Field of Search ................. 377/44, 46, 48, 52,
377/54, 72, 109, 122, 124, 47; 364/715, 770,
251.1, 251.2, 251.3, 238.7, 960.2, 960.3, 960.6

[56] References Cited

U.S. PATENT DOCUMENTS

| | | | |
|---|---|---|---|
| 3,081,031 | 3/1963 | Livesay | 377/47 |
| 3,393,298 | 7/1968 | Olson | 377/44 |
| 3,411,094 | 11/1968 | Martineck | 377/54 |
| 3,673,390 | 6/1972 | Krebs | 377/54 |
| 3,838,399 | 9/1974 | Sanabria | 377/52 |
| 3,891,973 | 6/1975 | Maxwell | 377/54 |
| 3,894,635 | 11/1974 | Freedman | 377/44 |
| 4,075,464 | 2/1978 | Davies, Jr. | 377/111 |
| 4,084,082 | 4/1978 | Alfke | 377/47 |
| 4,218,750 | 8/1980 | Carter et al. | 377/111 |
| 4,241,410 | 12/1980 | Depuy | 364/715 |
| 4,256,954 | 3/1981 | Someshwar | 377/54 |
| 4,519,091 | 5/1985 | Chu et al. | 377/44 |
| 4,530,108 | 7/1985 | Wilmsmeyer | 377/111 |

FOREIGN PATENT DOCUMENTS 0139025  7/1985  Japan ................. 377/47

OTHER PUBLICATIONS

G. Williams—"Digital Technology", Science Research Associates—1977, 1982—pp. 283–285.
*Computer System Architecture*, pp. 54–59, M. Morris Mano, 1982, Prentice-Hall, Inc.

*Primary Examiner*—John S. Heyman
*Assistant Examiner*—Tai V. Duong
*Attorney, Agent, or Firm*—Townsend & Townsend

[57] ABSTRACT

As the incrementer of the invention comprises a shift register for its lower order bits, while its higher bit portions are constructed in the same way as a conventional incrementer, the incrementer can give output signals directly to a memory and the like without the necessity of decoding the same, and the incrementer is free from carry propagation delay possibilities, which assures an improved rate of operation of the incrementer as a whole.

4 Claims, 7 Drawing Sheets

| INPUT | | OUTPUT | |
|---|---|---|---|
| CARRY INPUT 4 | INPUT FROM LATCH | CARRY OUTPUT 5 | INCREMENTED VALUE |
| 0 | 0 | 0 | 0 |
| 0 | 1 | 0 | 1 |
| 1 | 0 | 0 | 1 |
| 1 | 1 | 1 | 0 |

| | 2nd INCREMENTER | OUTPUT 1st INCREMENTER |
|---|---|---|
| 0 | 0 0 | 0 0 0 0 0 0 0 0 0 1 |
| 1 | 0 0 | 0 0 0 0 0 0 0 0 1 0 |
| 2 | 0 0 | 0 0 0 0 0 0 0 1 0 0 |
| 3 | 0 0 | 0 0 0 0 0 0 1 0 0 0 |
| 4 | 0 0 | 0 0 0 0 0 1 0 0 0 0 |
| 5 | 0 0 | 0 0 0 0 1 0 0 0 0 0 |
| 6 | 0 0 | 0 0 0 1 0 0 0 0 0 0 |
| 7 | 0 0 | 0 0 1 0 0 0 0 0 0 0 |
| 8 | 0 1 | 0 1 0 0 0 0 0 0 0 1 |
| 9 | 0 1 | 1 0 0 0 0 0 0 0 1 0 |
| ... | ... | ... |
| 30 | 1 1 | 0 1 0 0 0 0 0 0 0 0 |
| 31 | 1 1 | 1 0 0 0 0 0 0 0 0 0 |

Fig. 6 (a)

| | OUTPUT |
|---|---|
| 0 | 0 0 0 0 0 0 0 0 0 0 |
| 1 | 0 0 0 0 0 0 0 0 0 1 |
| 2 | 0 0 0 0 0 0 0 0 1 0 |
| 3 | 0 0 0 0 0 0 0 0 1 1 |
| 4 | 0 0 0 0 0 0 0 1 0 0 |
| 5 | 0 0 0 0 0 0 0 1 0 1 |
| 6 | 0 0 0 0 0 0 0 1 1 0 |
| 7 | 0 0 0 0 0 0 0 1 1 1 |
| 8 | 0 0 0 0 0 1 0 0 0 0 |
| 9 | 0 0 0 0 0 1 0 0 0 1 |
| ... | ... |
| 30 | 1 1 1 1 1 1 1 1 1 0 |
| 31 | 1 1 1 1 1 1 1 1 1 1 |

Fig. 7

CODED INCREMENTER HAVING MINIMAL CARRY PROPAGATION DELAY

BACKGROUND OF THE INVENTION

1. Field of the Invention

This invention relates to an incrementer to be incorporated in a microcomputer system or the like for use as, for example, a program counter.

2. Description of the Prior Art

Figure 1:
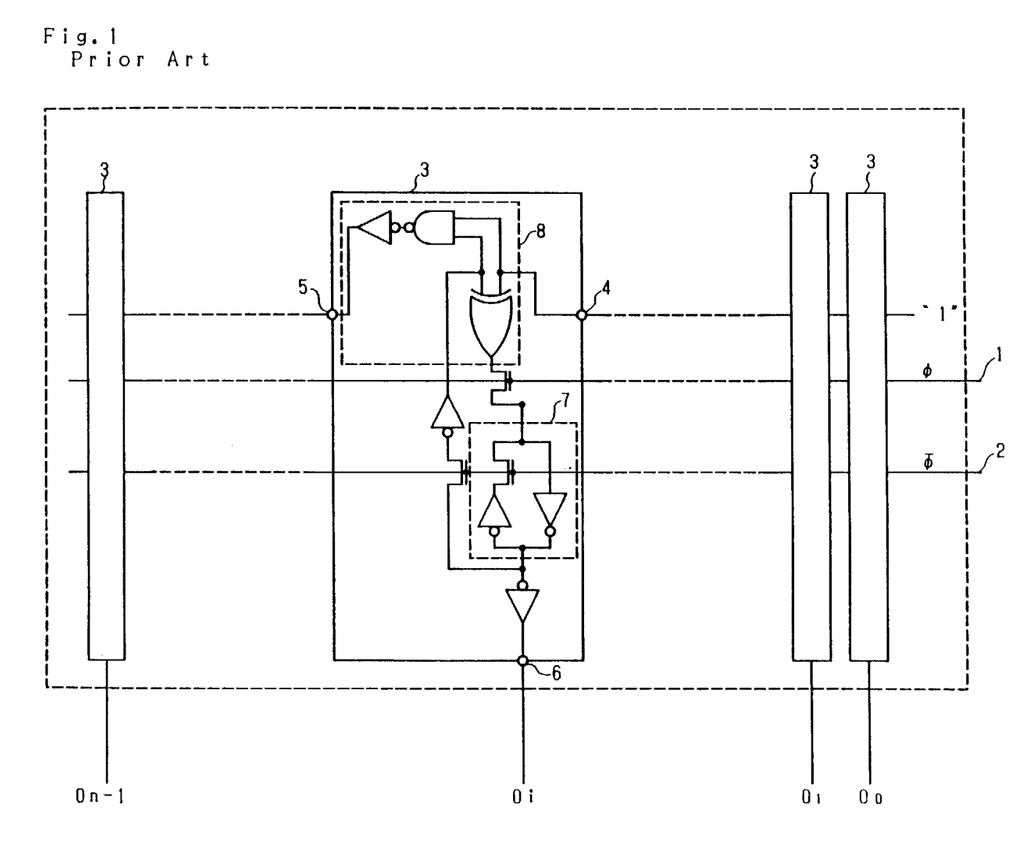
FIG. 1 is a circuit diagram showing, by way of example, the arrangement of a conventional incrementer.

FIG. 1 is a circuit diagram showing the arrangement of a conventional n-bit incrementer.

In the diagram, reference numerals 1 and 2 designate signal lines for non-overlapping clocks $\phi$, $\bar{\phi}$, and reference numerals 3, 3 . . . designate bit cells constituting the incrementer. As shown, the n-bit incrementer is comprised of n-bit cells 3.

In each bit cell 3, reference numeral 4 is a carry input terminal to which a carry from a next lower-order bit cell is inputted, numeral 5 is a carry output terminal for outputting a carry to a next higher-order bit cell, and reference numeral 6 is an output terminal for outputting a value resulting from an increment. Reference numeral 7 is a latch circuit which retains the incremented value. Reference numeral 8 is an increment operation circuit which, when a carry from the carry input terminal 4 is inputted thereto, adds "1" to the value retained in the latch circuit 7, and which outputs the result of the addition to the latch circuit 7 and a carry resulting from the addition to the carry output terminal 5.

Reference characters $O_0, O_1, \ldots O_i, \ldots O_{n-1}$ designate output signals for incremented values in each bit cell. Carry inputs to the bit cell of the 0th bit order are constantly set at "1" so that an increment is carried out each time the clock $\phi$ becomes "1".

Next the manner of operation of the above described conventional incrementer is explained. In each bit cell 3, the increment operation circuit 8, as FIG. 1 illustrates, carries out addition of a carry from the carry input terminal 4 to the data retained in the latch circuit 7. A sum resulting from the addition is outputted as a value of increment to the latch circuit 7 and a carry is outputted from the carry output terminal 5.

Figure 2:
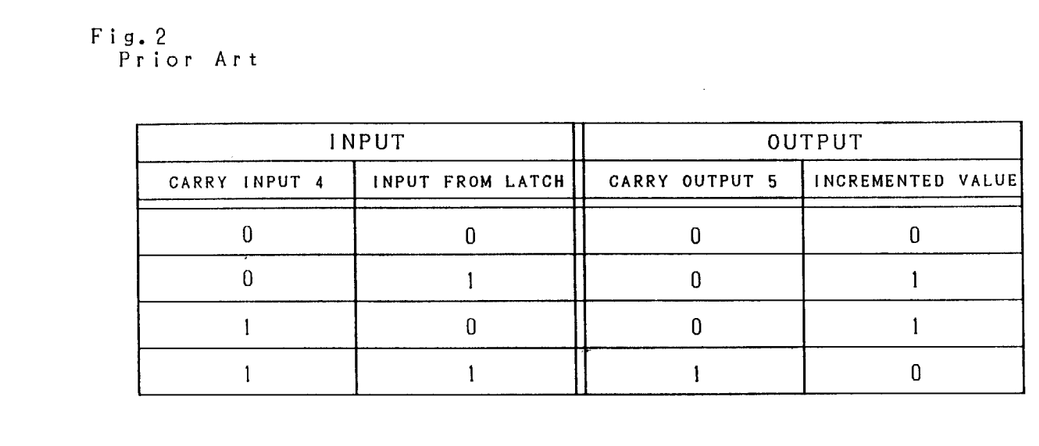
FIG. 2 is a tabulated representation of input/output signal relations therein.

The input/output relations in this connection are tabulated in FIG. 2. If either one of the inputs is "1" in value and the other is "0", value "1" is outputted as a value of increment, while otherwise value "0" is outputted as such. At the carry outputs, value "1" appears only when both inputs are "1" in value. Referring to the timing of operation of each bit cell 3, when $\phi$="1", data is inputted to the increment operation circuit 8 for operation therein, and the results of the operation a carry is outputted while $\bar{\phi}$="1" so that the output is inputted as an input data to a next higher-order increment operation circuit. Thus, new values are sequentially established from lower digit orders to higher digit orders. Output of a sum resulting from an addition is outputted from the terminal 6 at the timing of clock $\phi$="1", and the sum is held as such in the latch circuit 7.

Figure 3:
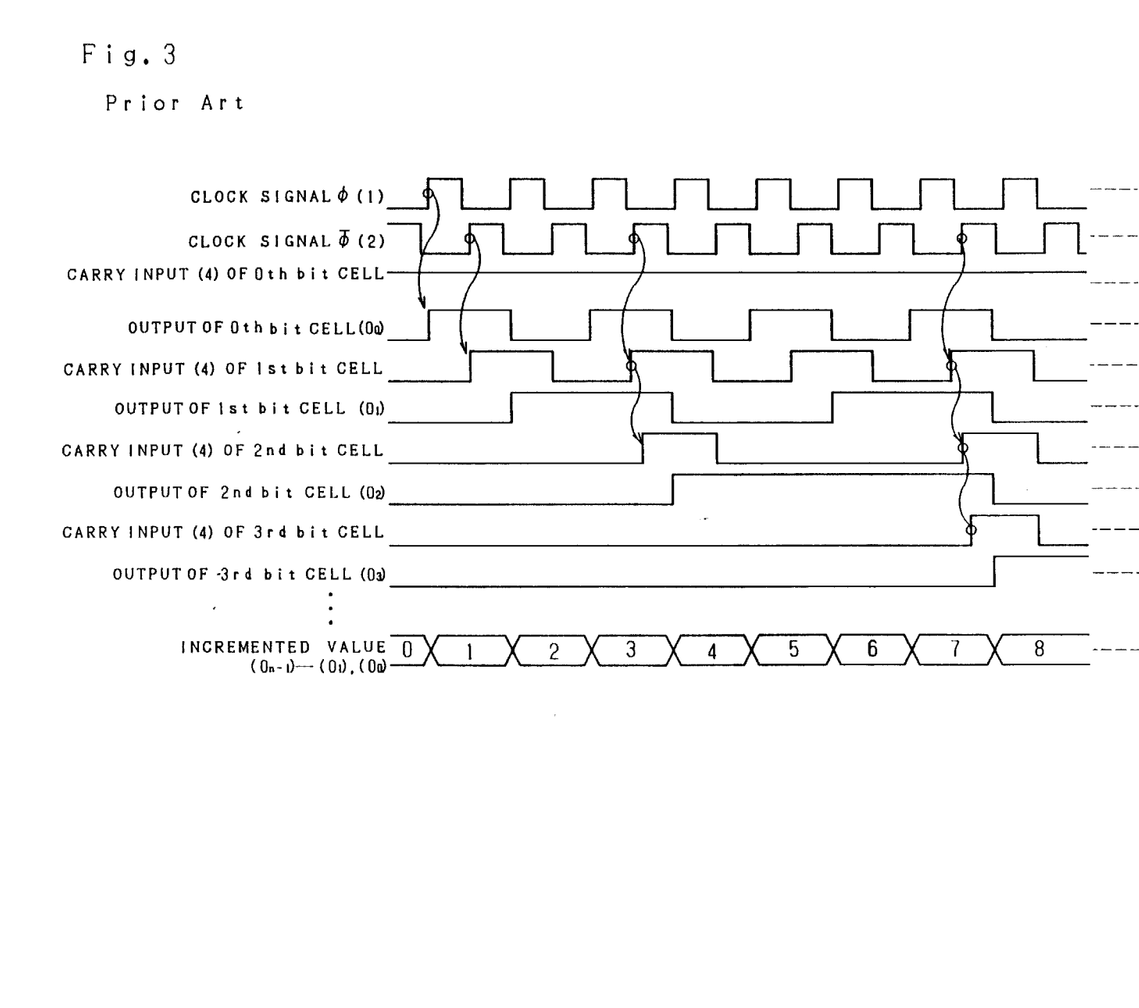
FIG. 3 is a timing chart showing the operation of the conventional incrementer.

Timings for operation of the entire incrementer are shown in a timing chart of FIG. 3.

Carry inputs to the bit cell in the 0th bit order are constantly set to "1". Therefore, value "1" is added to the bit cell in the 0th bit order each time $\phi$="1" is reached, and such sum and such carry as obtained from the addition are outputted accordingly. This carry is inputted as a carry input to the increment operation circuit in the first bit order, and it is added to the data in the latch circuit in the same way. Thus, a sum and a carry are calculated, and the carry is inputted as a carry input to the increment operation circuit 8 in a next higher bit order.

An incremented value is established only when a carry is propagated to the nth bit order after n−1 series of such carry propagation, and at succeeding series of timings for $\phi$="1", incremented values $O_0, O_1, \ldots O_i, \ldots O_{n-1}$ are sequentially output as such. A carry takes the process of propagating through n−1 units of inverters and NAND gates, and a delay is caused accordingly. This delay is generally called "carry propagation delay".

With such conventional incrementer as above described, decoding is required for selection of a word line, when an incremented binary digit indicates an address in a memory or the like. Therefore, a delay due to such decoding is inevitable. Another difficulty with the conventional incrementer is that increment operation of a bit cell at a higher bit order is influenced by the carry output of a bit cell at a lower bit order, which is a cause of a carry propagation delay.

SUMMARY OF THE INVENTION

This invention is intended to overcome aforesaid difficulties, and accordingly it is a primary object of the invention to provide an incrementer wherein the partial output of its incrementer can be applied directly as word signals or otherwise without the necessity of decoding the outputted.

It is a second object of the invention to provide an incrementer which can minimize carry propagation delay and thus can perform high-speed data processing.

Accordingly, the invention provides a binary digit incrementer for n digits comprising a first incrementer for lower order m digits comprising a shift register consisting of $2^m$ units of 1-bit shifters, from 0th bit to $2^m - 1$th bit, in which the shift output of the 1-bit shifter for the $2^m - 1$th bit is given to the shift input of the 1-bit shifter for the 0th bit, and a second incrementer for higher order n−m digits which increments n−m digits at each time when the shift output of the 1-bit shifter of the $2^m - 1$th bit of said shift register becomes significant level.

The above and further objects and features of the invention will more fully be apparent from the following detailed description with accompanying drawings.

BRIEF DESCRIPTION OF THE DRAWINGS

FIGS. 6 (a) and (b) are tabulated representations showing the output/input signal relations between the incrementer of the invention and the conventional incrementer shown in FIG. 1.

DESCRIPTION OF THE PREFERRED EMBODIMENTS

One embodiment of this invention is described with reference to the relevant drawings.

Figure 4:
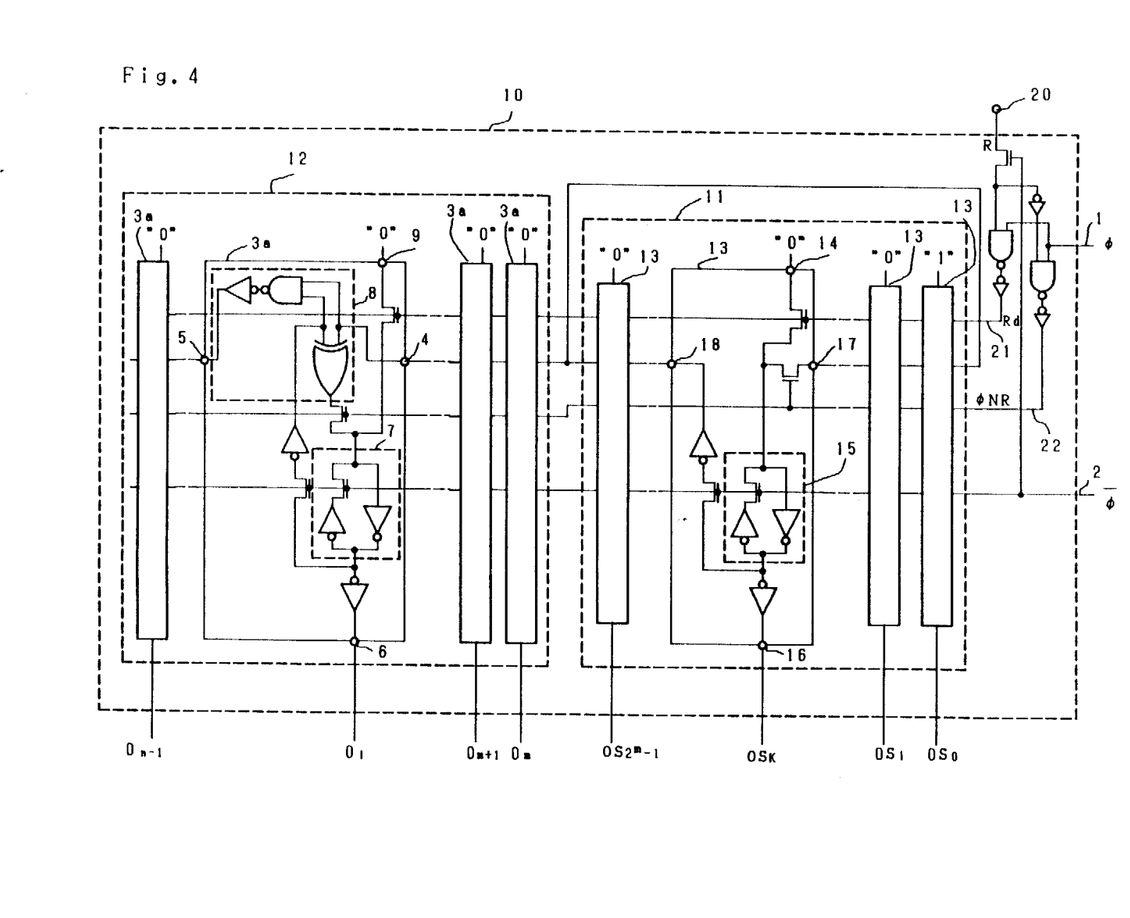
FIG. 4 is a circuit diagram showing one form of the arrangement of the incrementer embodying this invention.

FIG. 4 is a circuit diagram showing the arrangement of the incrementer according to the invention which operates in such a way that a binary digit number of n digits is increased by "1" for each one clock cycle.

In FIG. 4, reference numeral 10 designates the incrementer of the invention, and reference numeral 11 designates a first incrementer for lower order bits of the incrementer 10 of the invention which comprises a shift register for $2^m$ bits, from 0th bit to $2^m-1$th bit. Reference numeral 12 is a second incrementer for higher order bits of the incrementer 10 of the invention, which comprises bit cells 3a consisting of a reset mechanism provided in combination with the bit cells 3 of the conventional incrementer as described in the section of "Description of the Prior Art" hereof.

In each bit cell 3a, reference numeral 9 is a reset value input terminal to which a reset value "0" is input.

Reference numeral 13 is a 1-bit shifter for each one of each bit of the shift register constituting the first incrementer 11. In each 1-bit shifter 13, reference numeral 14 is a reset value input terminal of the shifter 13, which is so set as to take a reset value of "1" for the 0th bit shifter and a reset value of "0" for all the other shifters. Numeral 15 is a latch circuit which holds an incremented value as such. Numeral 16 is a terminal for outputting the value held in the latch circuit 15; numeral 17 is a shift input terminal for shifting values from the lower order bits; and 18 is a shift output terminal for shifting values to the higher order bits.

The output terminal of the 1-bit shifter 13 at the $2^m-1$th bit order of the first incrementer 11 is connected to the shift input terminal of the 1-bit shifter 13 at the 0th bit order and also connected to the carry input terminal 4 of the bit cell 3a constituting the lowermost bit order of the second incrementer 12. Therefore, each 1-bit shifter 13 of the shift register representing the first incrementer 11 is ring-shaped.

Reference numeral 20 is an input terminal for a reset signal R for resetting the incrementer 10; 21 is a signal line for a reset signal $R\phi$ of an AND signal for clock $\phi$ and reset signal R; and 22 is a signal line for clock signal $\phi$NR.

Characters $OS_0, OS_1, \ldots OS_k, \ldots Os_2{}^m-1$ designate output signals from the first incrementer, and $O_m, O_{m+1}, \ldots O_i, \ldots O_{n-1}$ designate output signals from the second incrementer 12, all representing incremented values.

Figure 5:
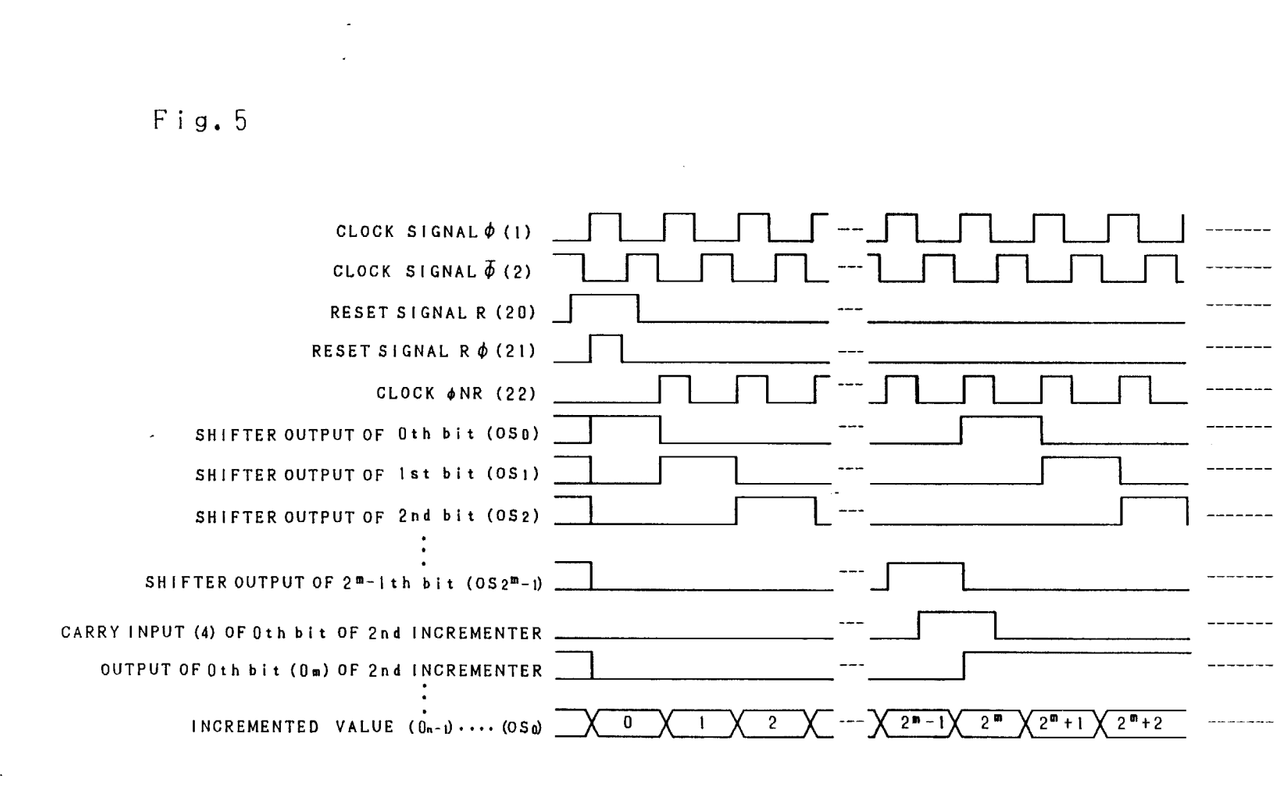
FIG. 5 is a timing chart for explanation of the operation of the incrementer of this invention.

Next, the manner of operation of the incrementer 10 is explained. FIG. 5 is a timing chart for the incrementer of the invention.

When value "1" is inputted from the reset terminal 20, the reset signal $R\phi$ is outputted from the signal line 21 at the timing of clock $\phi=$"1". At this point of time, clock signal $\phi$NR from the signal line 22 is "0".

When the reset signal $R\phi$ from the signal line 21 is "1", reset values are inputted through each reset value input terminal to each 1-bit shifter 13 of the first incrementer 11 and each bit cell 3a of the second incrementer 12 so that the incrementer 10 is reset to "1" for the 0th bit of the shift register as the first incrementer 11 and to "0" for all the bits, other than the 0th bit, of the shift register and all the bits of the second incrementer.

As the clock changes from "1" to "0", the condition of $\phi=$"1" is reached, and data is outputted from the output terminal 18 to the 1-bit shifter 13 at a 1-bit higher order. In the meantime, the reset terminal 20 is reset to "0".

When clock signal $\phi$NR from the clock signal line 22 changes from "0" to "1", data from the output terminal 16 of the 1-bit shifter at a lower bit order is inputted through the shift input terminal 17. That, is, each time the signal $\phi$NR from the clock signal line 22 changes from "0" to "1", value "1" is shifted to a 1-bit higher order.

At a point of time when signal $\phi$NR for value "1" has been given $2^m-1$ times, value "1" is shifted to the 1-bit shifter at the $2^m-1$th bit order, and at the next point of time when the condition of $\phi$NR=1 is reached, i.e., when $\phi$NR for value "1" has been given $2^m$ times, value "1" is outputted from the 1-bit shifter at the 0th bit order, whereupon the first incrementer 11 returns to its reset state.

At the point of time when the $2^m$th $\phi$NR=1 is reached, "1" is inputted to the carry input terminal of the bit cell at the lowermost bit order of the second incrementer 12 for the first time, and at the point of time of $2^m$th $\phi$NR="1", the second incrementer 12 is incremented by value "1".

This same process is repeated again and again so that the first incrementer 11 returns to its reset state every $2^m$th cycle of $\phi$NR while the second incrementer 12 is incremented by value "1" at same intervals. Each time $\phi$NR changes from "0" to "1", an incremented value is outputted from the output terminal 16 of each 1-bit shifter 13 of the first incrementer 11 and also from the output terminal 6 of each bit cell 3a of the second incrementer 12.

Now, the difference in output between the conventional incrementer and the incrementer of this invention is explained.

Figure 6:
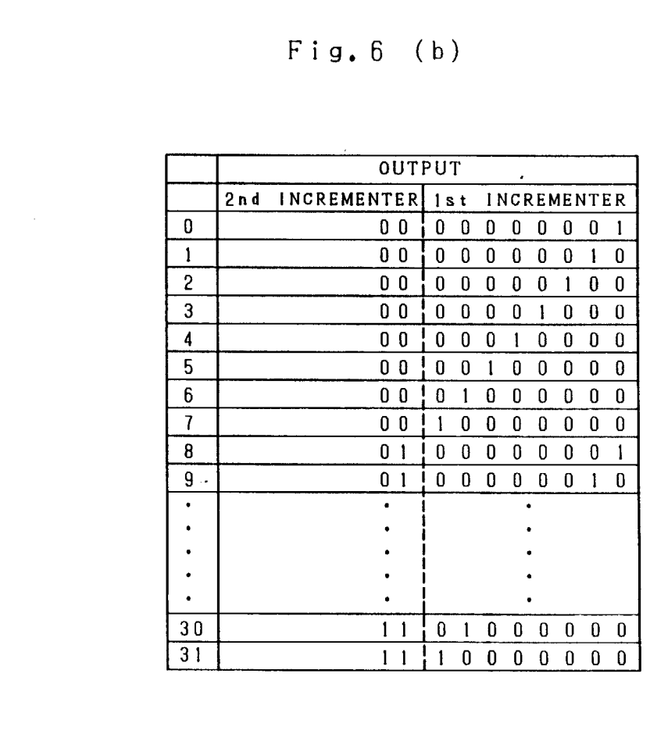

Within the scope of incrementers of the type which output digits of 0 to 31 of the decimal number, the conventional incrementer outputs values as shown in FIG. 6(a), whereas the incrementer of this invention outputs values as shown in FIG. 6(b).

That is, the conventional incrementer outputs values in only binary digits, whereas with the incrementer of the invention, the first incrementer 11 or the portion corresponding to the shift register for the lower digit portion, outputs signals for decoded values and the second incrementer 12, which corresponds to the higher digit portion, outputs values in binary digits. It can be seen from FIG. 6(b) that a value from the 1-bit shifter 13 at the 7th bit order (the highest bit order) should be used as a carry signal for the higher 2-bit incrementer.

According to the incrementer of the invention as above constructed, in the first incrementer 11 or the shift register portion, only one bit of the $2^m$ bits is "1" and all the other bits are "0". Therefore, when the output of the incrementer of the invention indicates an address in a memory, etc., the output of the shift register portion needs not be decoded and can be used directly as a word line. Furthermore, the shift register portion is free from the possibility of carry propagation delay. Therefore, according to the invention, by employing a $2^m$ bit shift register, it is possible to reduce carry propagation delay possibility only to that at $n-m-1$ points as a whole, though conventional n-digits incrementer, carry propagation delay occurred at n−1 points. This assumes high-speed operation of the incrementer.

As above described, the incrementer of this invention is such that its lower order bit portion consists of a shift register; therefore, the output of that portion can be used as word signals or otherwise without decoding same. Furthermore, the incrementer of the invention eliminate possible carry propagation delay at each bit, which fact assumes high-speed operation of the incrementer as a whole.

Next, for use of the incrementer of the invention with a microcomputer system by incorporating the former into the latter, a preferred arrangement is explained with reference to the block diagram of FIG. 7.

Figure 7:
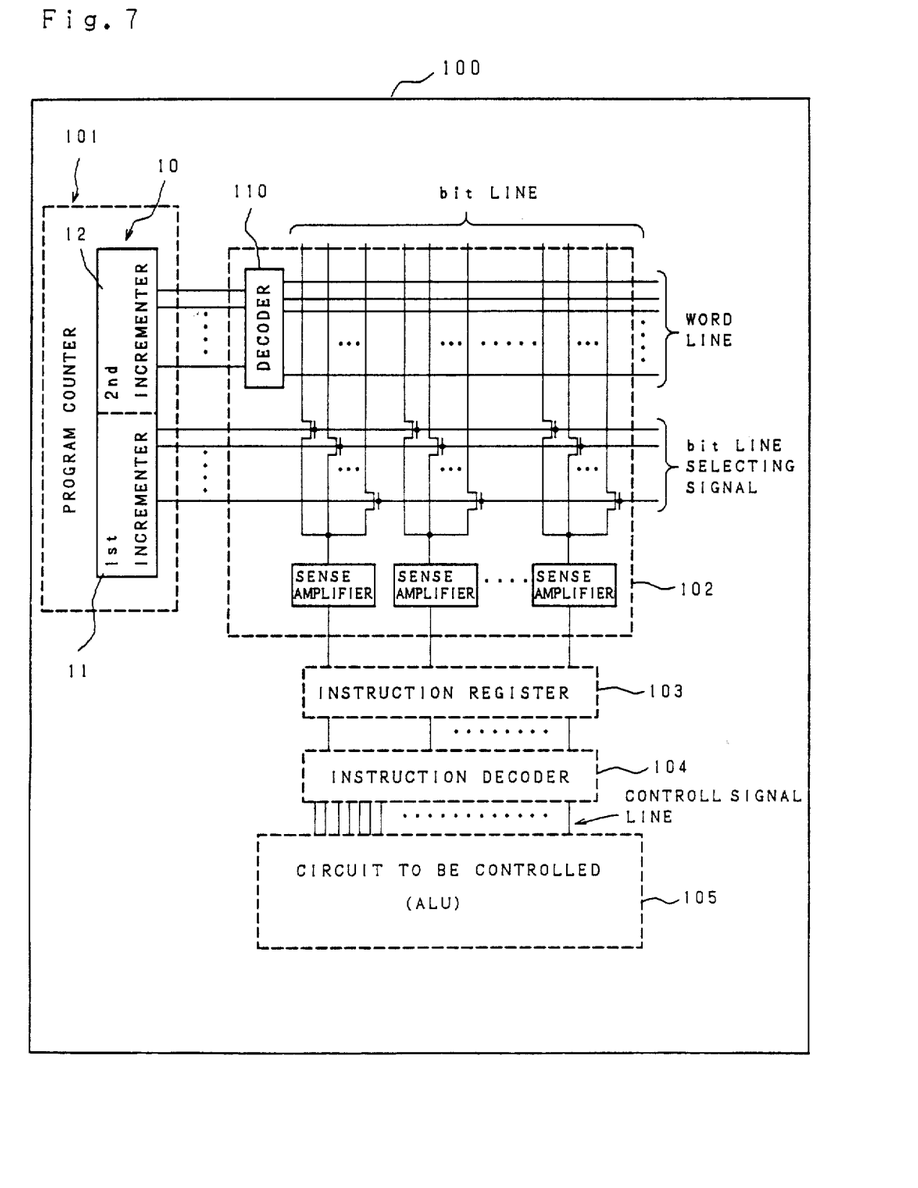
FIG. 7 is a block diagram showing, by way of example, a CPU arrangement incorporating the incrementer of the invention.

FIG. 7 illustrates a schematic arrangement of the microcomputer system. In the figure, reference numeral 100 designates the microcomputer, 101 designates a program counter generally, 102 designates an instruction memory, 103 designates an instruction register, 104 designates an instruction decoder and 105 designates a circuit to be controlled, e.g., ALU and the like.

The program counter 101 consists of the incrementer 10 of this invention, and therefore, the output of the lower digit portion of the incrementer, i.e., the first incrementer 11, can be outputted directly as a bit-line selecting signal for the instruction memory 102 without the necessity of channeling through a decoder.

It is noted that the output of the second incrementer 12, of the higher digit portion of the incrementer of this invention, is given as a word signal to the instruction memory 102 after being decoded through the decoder 110 as is the case with the conventional arrangement.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A binary digit incrementer for n (a chosen number) digits comprising:
    a first incrementer for lower order m (a chosen number less than n) digits comprising a shift register including $2^m$ units of 1-bit shifters, from 0th bit to $2^m-1$th bit, in which the shift output of the 1-bit shifter for the $2^m-1$th bit is input to the shift input of the 1-bit shifter for the 0th bit, and
    a second incrementer, coupled to said first incrementer, for higher order n−m digits which increments n−m digits each time after the shift output of the 1-bit shifter for the $2^m-1$th bit of said shift register becomes a predetermined level.

2. The incrementer according to claim 1, further comprising reset means for setting the output of the 0th bit of said shift register to "1" and the outputs of all the bits, other than the 0th bit, of said shift register and of all the bits of said second incrementer, to "0".

3. A microcomputer, comprising:
    a program counter for producing address signals to be sequentially incremented; and
    an instruction memory from which instructions, stored in addresses corresponding to said address signals produced by said program counter, are sequentially read out,
    said program counter being a binary digit incrementer for n (a chosen number) digits comprising a first incrementer for lower order m (a chosen number less than n) digits comprising a shift register including $2^m$ units of 1-bit shifters, from 0th bit to $2^m-1$th bit, in which the shift output of the 1-bit shifter for the $2^m-1$th bit is input to the shift input of the 1-bit shifter for the 0th bit, and a second incrementer coupled to said first incrementer for higher order n−m digits which increments n−m digits each time after the shift output of the 1-bit shifter for the $2^m-1$th bit of said shift register becomes a predetermined level.

4. A binary digit incrementer for n (a chosen number) digits consisting of lower order m digits (a chosen number less than n) and higher order n−m digits wherein, each of the lower order m digits is connected directly to one of a plurality of bit lines and does not need to be decoded and the higher order n−m digits are connected to a decoder for decoding the higher order n−m digits before they are sent to word lines, comprising:
    a first incrementer for the lower order m digits, comprising a shift register including $2^m$ units of 1-bit shifters, each 1-bit shifter having a shift output line for transmitting a shift value to the next higher 1-bit shifter, a shift input line for receiving a shift value, and an output terminal for transmitting a signal to one of said bit lines, said 1-bit shifters serially connected in a ring configuration such that said shift output line of the $2^m-1$th bit shifter is fed back to said shift input line of the 0th bit shifter;
    a second incrementer for the higher order n−m digits. including n−m bit cells, each bit cell having a carry output terminal for transmitting a carry signal to the next higher bit cell, a carry input terminal for receiving a carry signal, and a bit cell output for transmitting a bit cell signal to the decoder, said carry input terminal of the 0th bit cell connected to said shift output line of said $2^m-1$th bit shifter of said shift register for receiving said shift value from said $2^m-1$th bit shifter of said shift register, said second incrementer incrementing n−m digits each time after said shift output line of said $2^m-1$th bit shifter of said shift register becomes a predetermined level; and
    a reset line connected to each of said $2^m$ units of 1-bit shifters of said shift register and each of said n'm bit cells of said second incrementer, wherein when a reset signal is received on said reset line, said binary digit incrementer is reset to a preselected level.

* * * * *